United States Patent
Mishra et al.

(10) Patent No.: US 10,372,690 B2
(45) Date of Patent: Aug. 6, 2019

(54) DYNAMIC JOINING OF DATABASE TABLES

(71) Applicant: Teradata US, Inc., Dayton, OH (US)

(72) Inventors: Sanjib Mishra, Telangana (IN); Rama Krishna Korlapati, El Segundo, CA (US)

(73) Assignee: Teradata US, Inc., San Diego, CA (US)

( * ) Notice: Subject to any disclaimer, the term of this patent is extended or adjusted under 35 U.S.C. 154(b) by 373 days.

(21) Appl. No.: 15/377,380

(22) Filed: Dec. 13, 2016

(65) Prior Publication Data

US 2017/0193014 A1     Jul. 6, 2017

Related U.S. Application Data

(60) Provisional application No. 62/272,830, filed on Dec. 30, 2015.

(51) Int. Cl.
G06F 16/21     (2019.01)
G06F 16/22     (2019.01)
G06F 16/2455   (2019.01)

(52) U.S. Cl.
CPC ........ G06F 16/211 (2019.01); G06F 16/2282 (2019.01); G06F 16/2456 (2019.01)

(58) Field of Classification Search
CPC .................................................. G06F 16/211
See application file for complete search history.

(56) References Cited

U.S. PATENT DOCUMENTS

2009/0248617 A1 * 10/2009 Molini ............. G06F 16/24544
2010/0088298 A1 *  4/2010 Xu ..................... G06F 16/2456
                                                                707/705

* cited by examiner

*Primary Examiner* — Van H Oberly
(74) *Attorney, Agent, or Firm* — Schwegman, Lundberg & Woessner, P.A.

(57) ABSTRACT

Disclosed are systems and methods for dynamic joining of database tables. The systems and methods can include: selecting a first table from a plurality of tables; selecting a second table from the plurality of tables; joining the first table and the second table to create a temporary table; and storing, in a memory of a computing device, the temporary table and the temporary skew value. The first table can have a first skew value. The second table can have a second skew value. The second skew value can be similar to the first skew value. The temporary table can have a temporary skew value.

14 Claims, 3 Drawing Sheets

DYNAMIC JOINING OF DATABASE TABLES

RELATED APPLICATIONS

This application claims the benefit of priority to U.S. Provisional Patent Application Ser. No. 62/272,830, filed Dec. 30, 2015, the content of which is incorporated herein by reference in its entirety.

BACKGROUND

A database is an organized collection of data. It is the collection of schemas, tables, queries, reports, views and other objects. The data is typically organized to model aspects of reality in a way that supports processes requiring information, such as modelling the availability of rooms in hotels in a way that supports finding a hotel with vacancies. Databases can be accessible by one or more users or application.

SUMMARY

Disclosed are systems and methods for dynamic joining of database tables. The systems and methods can include: selecting a first table from a plurality of tables; selecting a second table from the plurality of tables; joining the first table and the second table to create a temporary table; and storing, in a memory of a computing device, the temporary table and a temporary skew value. The first table can have a first skew value. The second table can have a second skew value. The second skew value can be similar to the first skew value. The temporary table can have the temporary skew value.

BRIEF DESCRIPTION OF THE DRAWINGS

The above-mentioned and other features and advantages of this disclosure, and the manner of attaining them, will become more apparent and the disclosure itself will be better understood by reference to the following description of embodiments taken in conjunction with the accompanying drawings, where.

Corresponding reference characters indicate corresponding parts throughout the several views. The exemplifications set out herein illustrate example embodiments, and such examples are not to be construed as limiting the scope of the claims in any manner.

DETAILED DESCRIPTION

Figure 1:
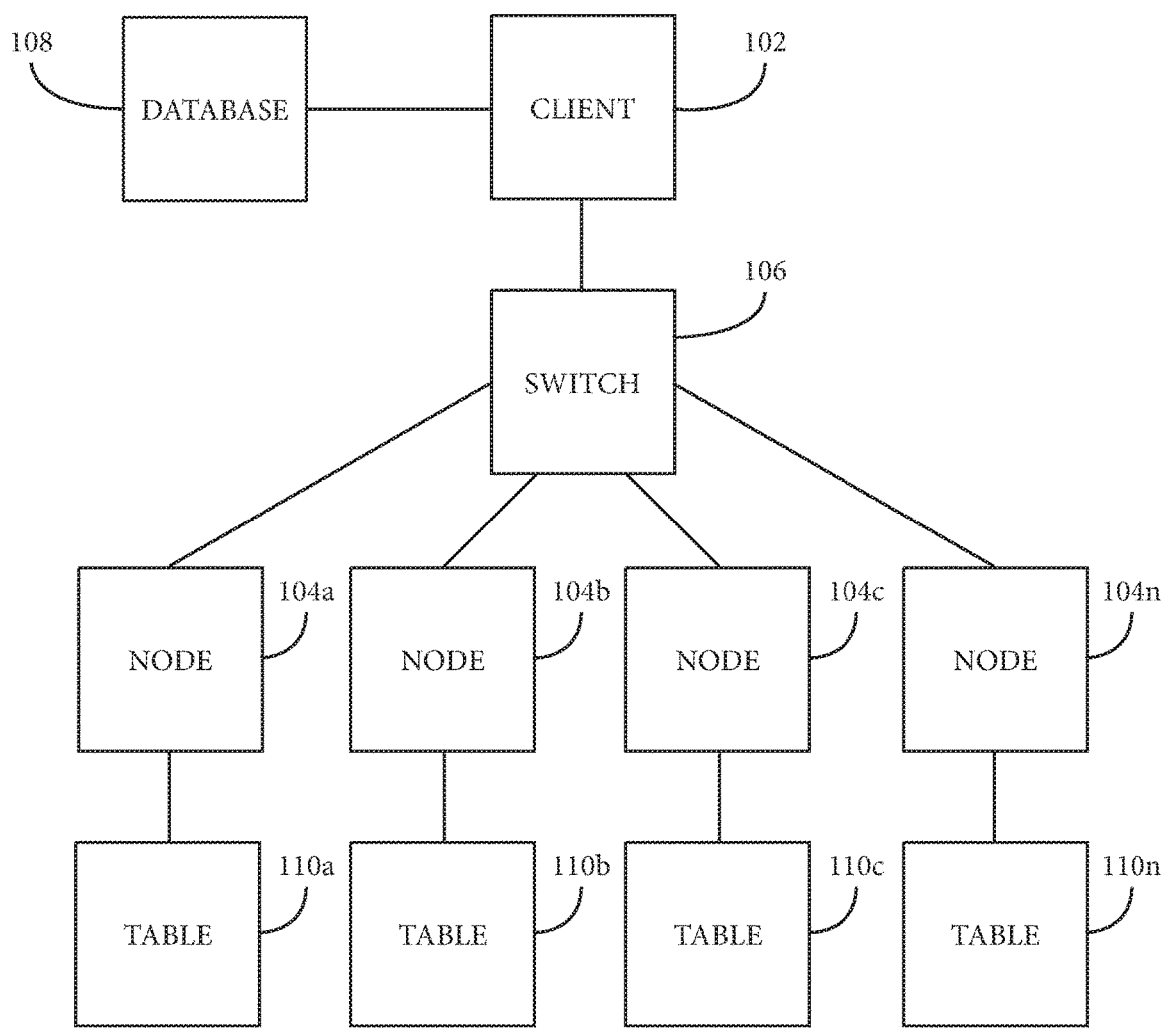
FIG. 1 illustrates an example system for dynamic joining of database tables in accordance with embodiments disclosed herein.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the discloses systems. Accordingly, the following detailed description does not limit the disclosure. Instead, the proper scope of any invention disclosed herein is defined by the appended claims.

Large databases can be distributed across multiple nodes. Each of the nodes can be used to perform various data processing functions on the database. The use of various nodes allows the data processing functions to be faster because multiple computers are performing a portion of the data processing on smaller portions of the database instead of one computer trying to perform all the data processing functions on the entire database. The database can be a table structure of data.

To distribute the database across multiple nodes a hash function is used. The hash function can determine which nodes various portions of the database or tables are distributed to and return hash values. The hash values can allow an application to retrieve the various portions of the database or information from within the various portions of the database when needed. Depending on how the database is hashed, skew can be introduced. Skew can be a result of the various tables being of different sizes. Skewness can be a statistical term that refers to a row distribution on access module processors (AMPs). If the data is highly skewed, it means some AMPs have more rows and some less. Stated another way, skewness can be a statistical measure of how evenly or unevenly data is distributed among various nodes.

In parallel systems, tables may need to be re-hashed/shuffled to co-locate the rows based on join columns to do join commands (sometimes called "joins"). When there are equality join conditions on non-primary index columns, an optimizer can try to plan operations by rehashing on the join columns/expressions. If the columns/expressions are skewed, the rehashing can cause uneven distribution of rows across AMPs and degrade query performance. Partial redistribution and partial duplication (PRPD) can attempt to solve this issue by handling the skewed rows differently from the rest of rows. An PRPD join strategy can be to split both the relations into sub-relations based on skewed values. The sub-relations can then be joined in separate steps. The join result from sub-relations can be directed to a common spool. If one of the input relations is skewed, the relations can be split into two sub-relations each and two joins can be performed. If both the input relations are skewed, the relations can be split into three sub-relations each and three split joins can be performed.

One challenge for a PRPD join method can be to detect the skewed values and their frequencies. Collected statistics can be used to identify the skewed values and their frequencies. However, missing, stale, or sampled statistics may not always detect the skewed values. Also, even with the accurate statistics, it may not always be possible to accurately detect the presence or absence of skewed values after applying single table conditions and/or after certain joins. This limits the applicability of the PRPD join method to optimize the joins with skewed data on join columns.

The skewed value information can be derived on intermediate spool tables dynamically using incremental planning and execution (IPE) and dynamic statistics infrastructure. Using the intermediate spool tables, sometimes called temporary tables, and dynamically derived skew values, a PRPD plan can be generated.

IPE can refer to a planning and optimization strategy that can be used to break a query into fragments, incrementally planning and executing the fragments, and applying the results or statistics feedback from these fragments to the remainder of the query. If the query fragment being executed produces a small result set and it can be accommodated in the remainder query, results can be retrieved. Otherwise, statistics can be retrieved for the intermediate spool table materialized in the fragment. IPE can use a dynamic statistics collection mechanism to collect the statistics such as row count, number of distinct values, high mode frequency of columns of interest, etc. on the intermediate spools.

In one example, the dynamic statistics to retrieve top K skewed values or their corresponding hashes for the columns that are used in subsequent joins can be enhanced. In general, finding the actual skewed values in a parallel system without doing an aggregation can be expensive in terms of processing time and processor overhead. However, it is possible to find the hash code of the skewed values with minimal overhead. Once the hash values of the skewed values are identified, the joins can be applied as described herein.

The estimation of skewed hashes and their corresponding frequencies by one-pass scan of the temporary table can be done using a TOP-K buffer approach. The Top-K frequent buffer approach can include maintaining a buffer keeping K number of frequent values and their aggregated frequencies while data is scanned. When the buffer is full, the least frequent value can be purged out. An enhanced version of this approach can be used by considering a reservoir buffer to estimate the number of unique values (NUV buffer) to avoid the problem of purging out the most frequent value in the middle of the scan if its frequency is the lowest at the time the buffer is full. The enhancement can maintain hash frequencies not only in the TOP-K buffer but also in the NUV buffer. The NUV buffer can be responsible for maintaining the frequencies of hashes that belong to a NUV target domain. The TOP-K buffer can be responsible for the other hashes and their frequencies. When the NUV target domain is full, hashes and frequencies to be purged can be added to the TOP-K buffer before their purging. Using the NUV buffer with frequencies is similar to increasing the size of TOP-K buffer. That is, the most frequent value has more chance to be aggregated in buffers and has less chance to be purged. However, this approach can reduce the TOP-K buffer management cost significantly because it is not required for the TOP-K buffer to be updated every time a data value is read (i.e., only the values whose hashes do not belong to the NUV target buffer). Whereas, the cost of updating frequency in the MTV buffer is trivial because there is no extra search to find a matching hash, which is already a part of NUV buffer management.

FIG. 1 shows an example system 100 for dynamic joining of database tables. The system 100 can include a client 102 that can be connected to a plurality of nodes 104a-104n by a switch 106. As discussed below with regards to FIGS. 2 and 3, the client 102 can store a database 108. The database 108 can be distributed across the plurality of nodes 104a-104n. For example, during the distribution process, the client 102 can utilize a hash algorithm to divide the database 108 into a plurality of tables 110a-110n that can be stored on corresponding nodes 104a-104n.

The distribution of the database 108 can cause each of the plurality of tables 110a-110n to have a skew. The skew can be caused by the plurality of tables 110a-110n having a different number of rows. For example, the database 108 may contain a listing of vendors or users of a service. Each of the vendors or users may utilize the service at different levers. For instance, some users may be high volume users by multiple orders of magnitude as compared to other users.

Due to the various usage, some users may have more data records associated with them than other users. During the hashing process, tables storing data records for high volume users may be sent to various nodes and tables storing data records for low volume users may be sent to a single node for storage and data processing.

During a query, the plurality of tables 110a-110n, or a subset of thereof, may need to be joined. Due to the skewness of the plurality of tables 110a-110n, joining the plurality of tables 110a-110n by randomly selecting tables can lead to errors. As disclosed herein, the client 102 can select tables from the plurality of tables 110a-110n to be joined using skew statistics about each of the plurality of tables 110a-110n. For example, the client 102 can utilize skew statistics such as, but not limited to, a row count, a number of distinct values, and a high mode frequency of columns of interest in selecting tables to join. In addition, information about the hash algorithm such as, but not limited to, hash code skew values, can be used to select tables. Stated another way, and as discussed below, the client 102 can utilize skew statistics and information about or obtained from the hash algorithm to create a plan for joining the plurality of tables 110a-110n.

Figure 2:
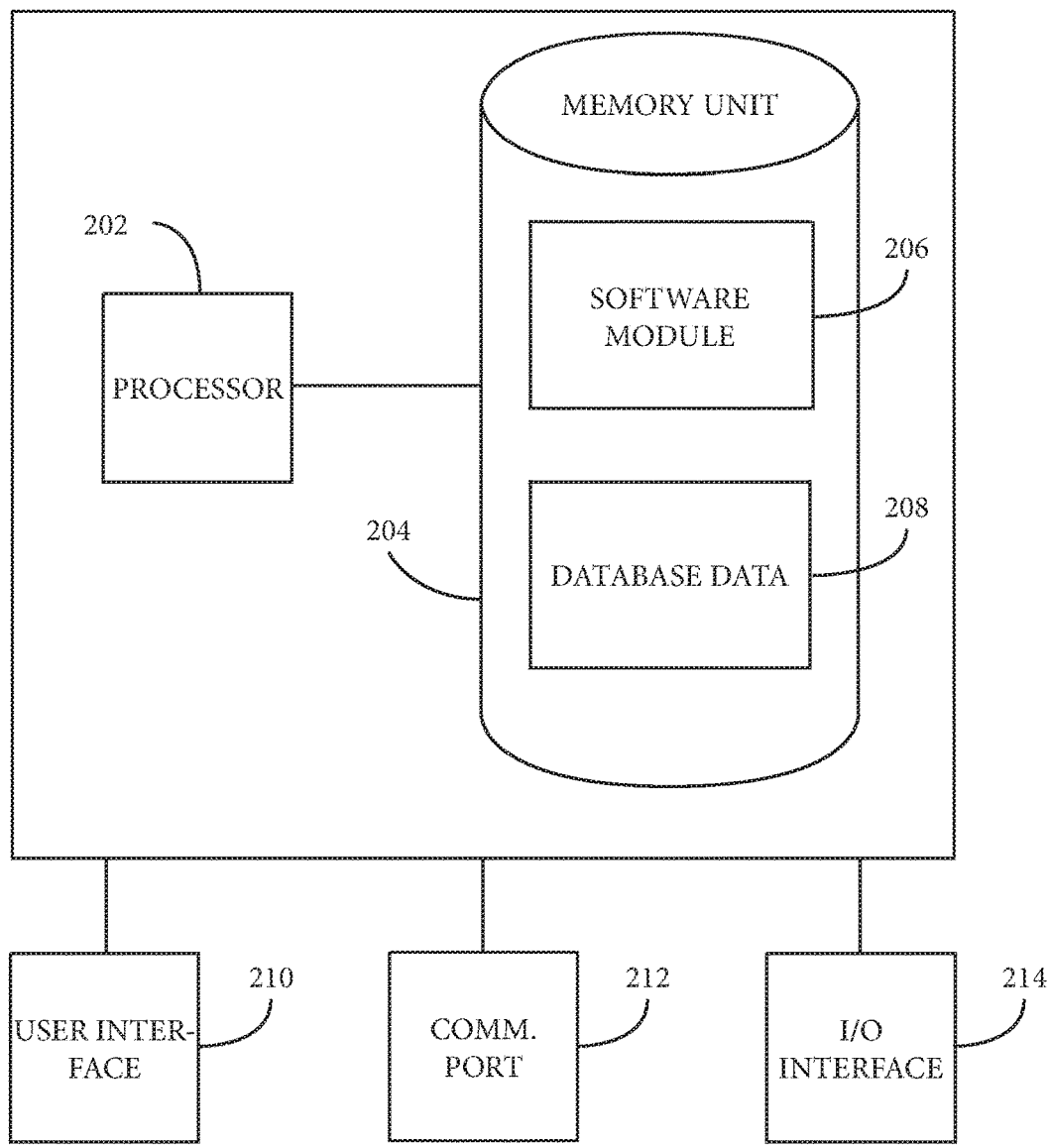
FIG. 2 illustrates an example schematic of a computing device in accordance with embodiments disclosed herein.

FIG. 2 shows an example schematic of a computing device 200 in accordance with embodiments disclosed herein. Computing device 200 can be implemented as the client 102, the plurality of nodes 104a-104n, and the switch 106. As shown in FIG. 2, the computing device 200 may include a processor 202 and a memory unit 204. The memory unit 204 may include a software module 206 and database data 208. While executing on the processor 202, the software module 204 may perform processes for dynamic joining of database tables, including, for example, one or more stages included in a method 300 described below with respect to FIG. 3.

The database data 208 can include the database 108 described above. In addition, the database data 208 can include database statistics such as, but not limited to, skew information and skew statistics. The database data 208, or portions of the database data 208, can be generated by the computing device 200 (e.g., by the client 102). In addition, the database data 208, or portions of the database data 208, can be received by the computing device 200. For example, the database data 208 may include a listing of the plurality of nodes 104a-104n that store portions of the database 108. The listing may generated by the computing device 200. Acknowledgement messages from each of the plurality of nodes 104a-104n indicated what portions of the database 108 are stored on each of the plurality of nodes 104a-104n may also be stored in the memory unit 204.

The computing device 200 can also include a user interface 210. The user interface 210 can include any number of devices that allow a user to interface with the computing device 200. Non-limiting examples of the user interface 210 include a keypad, a microphone, a speaker, a display (touchscreen or otherwise), etc.

The computing device 200 can also include a communications port 212. The communications port 212 can allow the computing device 200 to communicate with switches, nodes, or other computing devices such as those described above with regard to FIG. 1. Non-limiting examples of the communications port 212 include, Ethernet cards (wireless or wired), Bluetooth® transmitters and receivers, near-field communications modules, etc.

The computing device 200 may also include an input/output (I/O) device 214. The I/O device 214 can allow the computing device 200 to receive and output information.

Non-limiting examples of the I/O device 214 include, a camera (still or video), a printer, a scanner, etc.

The computing device 200 can be implemented using a personal computer, a network computer, a mainframe, a handheld device, a personal digital assistant, a smartphone, or any other similar computer-based workstation. The computing device 200 can be located in close proximity to the various nodes and switches described herein. The computing device 200 can also be remote from the various nodes and switches described herein. For instance, the computing device 200 can be a desktop computer or a server that includes a software stack running a plurality of applications. The desktop computer or server can be located in close proximity to the switch 106 and remote from the plurality of nodes 104a-104n. In addition, the computing device 200 may be a personal computer interacting with a plurality of remote servers via a network of switches and routers.

Figure 3:
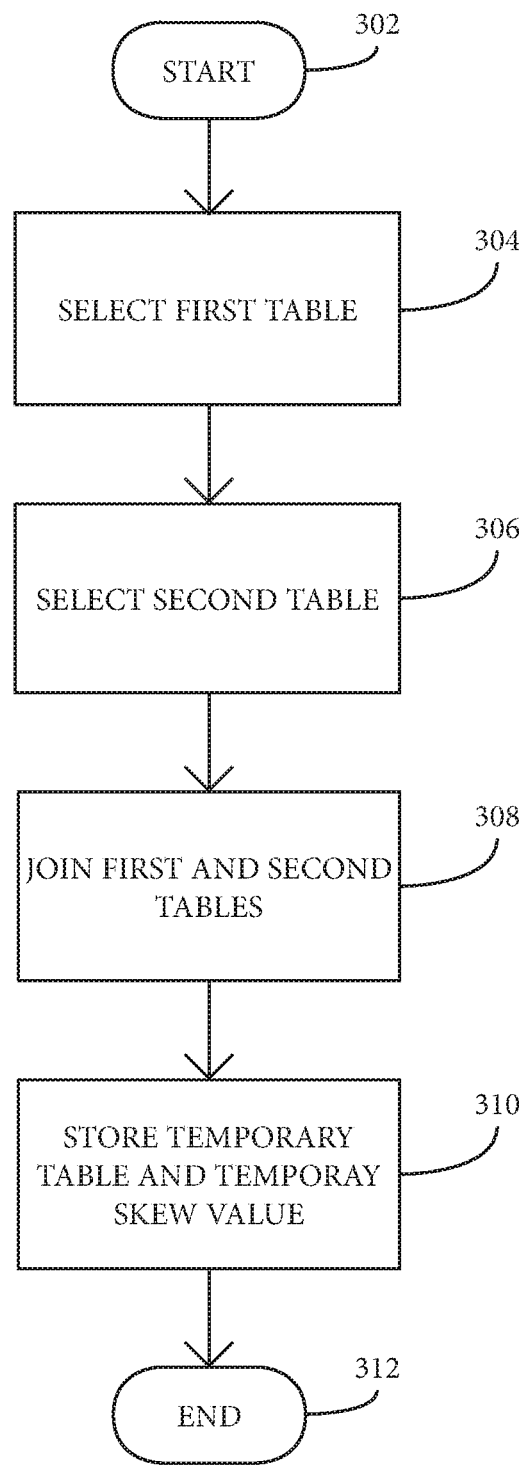
FIG. 3 illustrates an example method for dynamic joining of database tables in accordance with embodiments disclosed herein.

FIG. 3 shows an example method 300 for dynamic joining of database base tables. The method 300 can begin at stage 302 and proceed to stage 304 where a first table can be selected from a plurality of tables. For example, the table 110a can be selected from the plurality of tables 110a-110n.

From stage 304 the method 300 can proceed to stage 306 where a second table can be selected from the plurality of tables. For example, the table 110b can be selected from the plurality of tables 110a-110n that needs to be joined to the first table. The second table can be selected based on the skew statics for the plurality of tables. For example, the first table and the second table can have a skew value that is similar to one another. In other words, the second table can be selected because the second table has a similar size to the first table.

Before tables are selected, the computing device 200 can create a plan for selecting the tables to be joined. For example, the computing device 200 can utilize the skew value or other skew statistics for each of the tables to be joined to create an order for the tables to be joined.

From stage 306 the method 300 can proceed to stage 308 where the first table and the second table can be joined to create a temporary table. The temporary table can have a skew value and skew statistics of its own. The skew value and the skew statistics for the temporary table can be determined by the computing device 200 using the IPE framework.

The selecting of tables to be joined can be planned before any of the tables are joined. For example, the computing device 200 can utilize the skew values or other skew statistics to plan an order that the plurality of tables are to be joined.

In addition, the plan can be dynamically adjusted during the joining of multiple tables. For example, after joining the first and second tables to create the temporary table, the computing device 200 can utilize the skew value or other skew statistics that are computed dynamically for the temporary table to select a third table. For instance, the temporary table may have a skew value of X. When selecting a third table to be joined with the temporary table, the computing device 200 can examine the skew value and other skew statistics for the plurality of tables to select a table that has a skew value or other skew statistics that are similar to the skew value or other skew statistics of the temporary table.

When selecting tables to join, the computing device 200 can utilize the skew values and the other skew statistics to determine an error associated with the join operations due to the skew values of two selected tables. To select a table with a similar value of an already selected table (e.g., the first table or the temporary table), the computing device 200 can select a table who's skew value would minimize the error resulting from the join operation.

From stage 308 the method 300 can proceed to stage 310 where the temporary table and temporary skew value and other temporary skew statistics can be stored. For example, the temporary table, temporary skew value, and other temporary skew statistics can be stored in the memory unit 204.

After storing the temporary table, various stages of the method 300 can be repeated. For example, stage 306 may be repeated to select a third table to join with the temporary table. The third table can be selected as described herein to minimize error associated to skew value differences between the temporary table and the third table. From stage 310 the method 300 can terminate at stage 312.

ADDITIONAL EXAMPLES

To better illustrate the systems and methods disclosed herein, a non-limiting list of examples is provided here:

Example 1 includes a method. The method can include: selecting, by a computing device including a processor, a first table from a plurality of tables. The first table can have a first skew value. The method can also include selecting, by the computing device, a second table from the plurality of tables. The second table can have a second skew value. The second skew value can be similar to the first skew value. The method can further include joining, by the computing device, the first table and the second table to create a temporary table. The temporary table can have a temporary skew value. The method can further include storing, in a memory of the computing device, the temporary table and the temporary skew value.

In Example 2, Example 1 can optionally include selecting a third table from the plurality of tables, joining the temporary table with the third table to create a new temporary table, and storing the new temporary table in the memory. The third table can have a third skew value. The new temporary table can have a new temporary skew value.

In Example 3, any one of or any combination of Examples 1 and 2can optionally include the plurality of tables being stored on a plurality of nodes.

In Example 4, any one of or any combination of Examples 1-3 can optionally include determining a skew value for each of the plurality of tables prior to selecting the first table and selecting the second table.

In Example 5, any one of or any combination of Examples 1-4 can optionally include determining skew statistics for the temporary table. The skew statistics can optionally include a row count, a number of distinct values, and hashes of high mode values and their corresponding frequency of columns of interest.

In Example 6, any one of or any combination of Examples 1-5 can optionally include locating a hash code of skew values for each of the plurality of tables. Each of the hash code of skew values can be related to a skew value for a corresponding table of the plurality of tables. Joining the first table and the second table can include joining the first table and the second table based on the hash code skew values for the first table and the second table.

In Example 7, any one of or any combination of Examples 1-6 can optionally include the first table and the second table being selected based on a hash code skew value for each of the first table and the second table.

Example 8 includes a system. The system can include a processor and a memory. The memory can store instructions that, when executed by the processor, can cause the processor to perform operations. The operations can comprise selecting a first table from a plurality of tables. The first table can have a first skew value. The operations can further include selecting a second table from the plurality of tables. The second table can have a second skew value. The second skew value can be similar to the first skew value. The operations can further include joining the first table and the second table to create a temporary table. The temporary table can have a temporary skew value. The operations can further include storing the temporary table and the temporary skew value in the memory.

In Example 9, the system of Example 8 can optionally include the operations further including selecting a third table from the plurality of tables. The third table can have a third skew value. The operations can further include joining the temporary table with the third table to create a new temporary table, and storing the new temporary table in the memory. The new temporary table can have a new temporary skew value.

In Example 10, the system of any one of or any combination of Examples 8 and 9 can optionally include the plurality of tables being stored on a plurality of nodes.

In Example 11, the system of any one of or any combination of Examples 8-10 can optionally include the operations further including determining a skew value for each of the plurality of tables prior to selecting the first table and selecting the second table.

In Example 12, the system of any one of or any combination of Examples 8-11 can optionally include the operations further including determining skew statistics for the temporary table. The skew statistics can include a row count, a number of distinct values, and hashes of high mode values and their corresponding frequency of columns of interest.

In Example 13, the system of any one of or any combination of Examples 8-12 can optionally include the operations further comprising locating a hash code of skew values for each of the plurality of tables. Each of the hash code of skew values can be related to a skew value for a corresponding table of the plurality of tables. Joining the first table and the second table can include joining the first table and the second table based on the hash code skew values for the first table and the second table.

In Example 14, the system of any one of or any combination of Examples 8-13 can optionally include the first table and the second table being selected based on a hash code skew value for each of the first table and the second table.

Example 15 can include a computer-readable medium. The computer-readable medium can include instructions that, when executed by a processor, cause the processor to perform operations. The operations can include selecting a first table from a plurality of tables. The first table can have a first skew value. The operations can further include selecting a second table from the plurality of tables. The second table can have a second skew value. The second skew value can be similar to the first skew value. The operations can further include joining the first table and the second table to create a temporary table. The temporary table having a temporary skew value. The operations can further include storing the temporary table and the temporary skew value in a memory.

In Example 16, the computer-readable medium of Example 15 can optionally include the operations further comprising selecting a third table from the plurality of tables. The third table can have a third skew value. The operations can further include joining the temporary table with the third table to create a new temporary table. The new temporary table can have a new temporary skew value. The operations can further include storing the new temporary table in the memory.

In Example 17, the computer-readable medium of any one of or any combination of Examples 15 and 16 can optionally include the plurality of tables being stored on a plurality of nodes.

In Example 18, the computer-readable medium of any one of or any combination of Examples 15-17 can optionally include the operations further comprising determining a skew value for each of the plurality of tables prior to selecting the first table and selecting the second table.

In Example 19, the computer-readable medium of any one of or any combination of Examples 15-18 can optionally include the operations further comprising determining skew statistics for the temporary table. The skew statistics can include a row count, a number of distinct values, and hashes of high mode values and their corresponding frequency of columns of interest.

in Example 20, the computer-readable medium of any one of or any combination of Examples 15-19 can optionally include the operations further comprising locating a hash code of skew values for each of the plurality of tables. Each of the hash code of skew values can be related to a skew value for a corresponding table of the plurality of tables. Joining the first table and the second table can include joining the first table and the second table based on the hash code skew values for the first table and the second table.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A method comprising:
    locating a hash code of skew values for each of a plurality of tables, each hash code of skew a values related to a skew value for a corresponding table of the plurality of tables,
    selecting, by a computing device including a processor, a first table from the plurality of tables based on a located first hash code for the first table, the first table having a first skew value represented by the first hash code;
    selecting, by the computing device, a second table from the plurality of tables based on a located second hash code for the second table, the second table having a second skew value represented by the second hash code, the second skew value being similar to the first skew value;
    joining, by the computing device, the first table and the second table based on the first and second hash codes to create a temporary table, the temporary table having a temporary skew value;
    determining skew statistics for the temporary table, wherein the skew statistics include a row count a number of distinct values, and hashes of high mode values and their corresponding frequency of columns of interest; and
    storing, in a memory of the computing device, the temporary table, the temporary skew value, and the determined skew statistics.

2. The method of claim 1, further comprising:
    selecting a third table from the plurality of tables, the third table having a third skew value;

joining the temporary table with the third table to create a new temporary table, the new temporary table having a new temporary skew value; and storing the new temporary table in the memory.

3. The method of claim 1, wherein the plurality of tables are stored on a plurality of nodes.

4. The method of claim 1, further comprising determining a skew value for each of the plurality of tables prior to selecting the first table and selecting the second table.

5. The method of claim 1, wherein the first table and the second table are selected based on a hash code skew value for each of the first table and the second table.

6. The system of claim 1, wherein the first table and the second table are selected based on a hash code skew value for each of the first table and the second table.

7. A system comprising:
   a processor; and
   a memory that stores instructions that, when executed by the processor, cause the processor to perform operations comprising:
      locating a hash code of skew values for each of a plurality of tables, each hash code of skew a values related to a skew value for a corresponding table of the plurality of tables,
      selecting a first table from the plurality of tables based on a located first hash code for the first table, the first table having a first skew value represented by the first hash code,
      selecting a second table from the plurality of tables based on a located second hash code for the second table, the second table having a second skew value represented by the second hash code, the second skew value being similar to the first skew value,
      joining the first table and the second table based on the first and second hash codes to create a temporary table, the temporary table having a temporary skew value,
      determining skew statistics for the temporary table, wherein the skew statistics include a row count a number of distinct values, and hashes of high mode values and their corresponding frequency of columns of interest, and
      storing the temporary table, the temporary skew value, and the determined skew statistics in the memory.

8. The system of claim 7, wherein the operations further comprise:
   selecting a third table from the plurality of tables, the third table having a third skew value;
   joining the temporary table with the third table to create a new temporary table, the new temporary table having a new temporary skew value; and
   storing the new temporary table in the memory.

9. The system of claim 7, wherein the plurality of tables are stored on a plurality of nodes.

10. The system of claim 7, wherein the operations further comprise determining a skew value for each of the plurality of tables prior to selecting the first table and selecting the second table.

11. A non-transitory computer-readable medium comprising
   instructions that, when executed by a processor, cause the processor to perform operations comprising:
      selecting a first table from a plurality of tables, the first table having a first skew value;
      selecting a second table from the plurality of tables, the second table having a second skew value, the second skew value being similar to the first skew value;
      joining the first table and the second table to create a temporary table, the temporary table having a temporary skew value;
      determining skew statistics for the temporary table, wherein the skew statistics include a row count, a number of distinct values, and hashes of high mode values and their corresponding frequency of columns of interest; and
      storing the temporary table, the temporary skew value, and the determined skew statistics.

12. The non-transitory computer-readable medium of claim 11, wherein the operations further comprise:
   selecting a third table from the plurality of tables, the third table having a third skew value;
   joining the temporary table with the third table to create a new temporary table, the new temporary table having a new temporary skew value; and
   storing the new temporary table in the memory.

13. The non-transitory computer-readable medium of claim 11, wherein the plurality of tables are stored on a plurality of nodes.

14. The non-transitory computer-readable medium of claim 11, wherein the operations further comprise determining a skew value for each of the plurality of tables prior to selecting the first table and selecting the second table.

* * * * *